No. 728,661. PATENTED MAY 19, 1903.
A. H. & H. A. BERNS.
CORN SHELLER.
APPLICATION FILED JAN. 27, 1902.
NO MODEL. 5 SHEETS—SHEET 1.

Witnesses:
Roscoe A. Johnson
S. P. McKelvey

Inventors,
Andrew Herman Berns
and Herman Andrew Berns
By Glenn S. Noble
Att'y

No. 728,661. PATENTED MAY 19, 1903.
A. H. & H. A. BERNS.
CORN SHELLER.
APPLICATION FILED JAN. 27, 1902.
NO MODEL. 5 SHEETS—SHEET 3.

Witnesses:
R. A. Johnson
H. McKelvey

Inventors,
Andrew Herman Berns
and Herman Andrew Berns
By Glenn S. Noble Atty.

No. 728,661. PATENTED MAY 19, 1903.
A. H. & H. A. BERNS.
CORN SHELLER.
APPLICATION FILED JAN. 27, 1902.
NO MODEL. 5 SHEETS—SHEET 4.

Witnesses:
Roscoe A. Johnson.
S. F. McKelvey.

Inventors
Andrew Herman Berns
and
Herman Andrew Berns
By Glenn S. Noble
Att'y.

No. 728,661. PATENTED MAY 19, 1903.
A. H. & H. A. BERNS.
CORN SHELLER.
APPLICATION FILED JAN. 27, 1902.
NO MODEL. 5 SHEETS—SHEET 5.
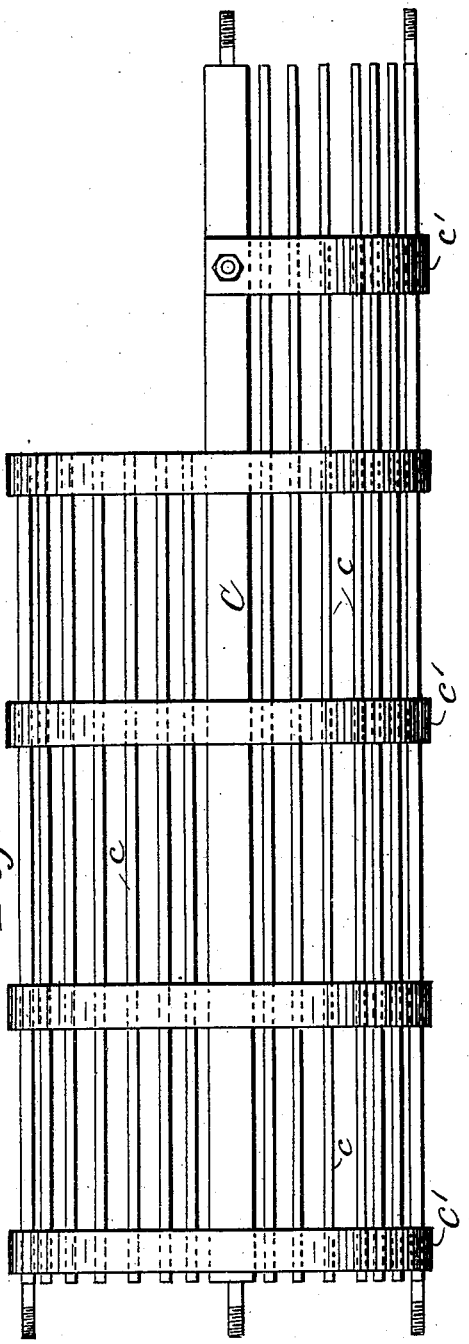
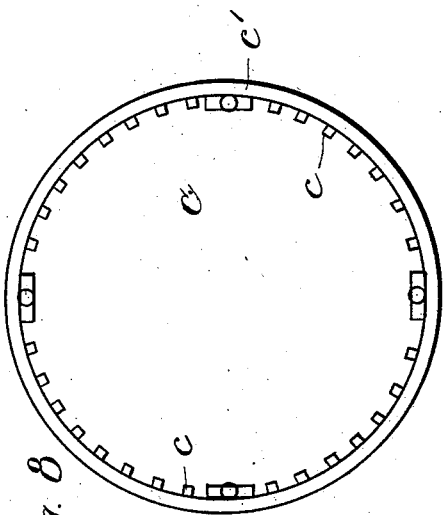
Witnesses:
Roscoe A. Johnson
S. T. McKelvey.
Inventors,
Andrew Herman Berns
and
Herman Andrew Berns
By Glenn S. Noble
Att'y.

No. 728,661. Patented May 19, 1903.

UNITED STATES PATENT OFFICE.

ANDREW HERMAN BERNS AND HERMAN ANDREW BERNS, OF CHEBANSE, ILLINOIS.

CORN-SHELLER.

SPECIFICATION forming part of Letters Patent No. 728,661, dated May 19, 1903.

Application filed January 27, 1902. Serial No. 91,501. (No model.)

*To all whom it may concern:*

Be it known that we, ANDREW HERMAN BERNS and HERMAN ANDREW BERNS, citizens of the United States, residing at Chebanse, in the county of Iroquois and State of Illinois, have invented certain new and useful Improvements in Corn-Shellers, of which the following is a specification.

This invention relates to machines for shelling corn, and more particularly that class designed to be operated by power and having a large capacity. Its objects are to provide a machine of this nature that will be compact and rigid in construction and as simple as the nature of the operations required will permit.

In operation our improved sheller requires comparatively small power and is durable and efficient, separating corn from the cob under the most adverse conditions and thoroughly cleaning the cobs and screening the shelled corn.

It consists in the various novel features and combinations which will be specified and claimed hereinafter and shown in the accompanying drawings, in which—

Figure 1:
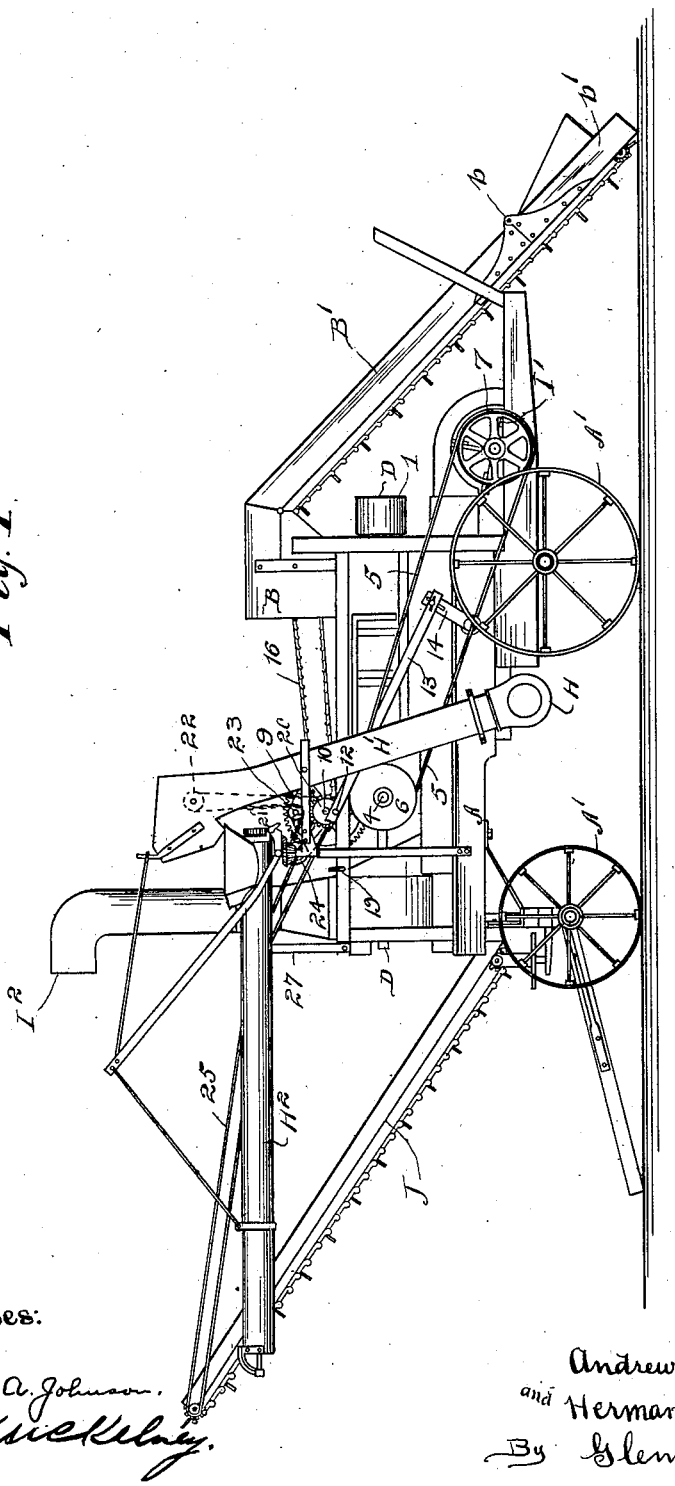
Figure 2:
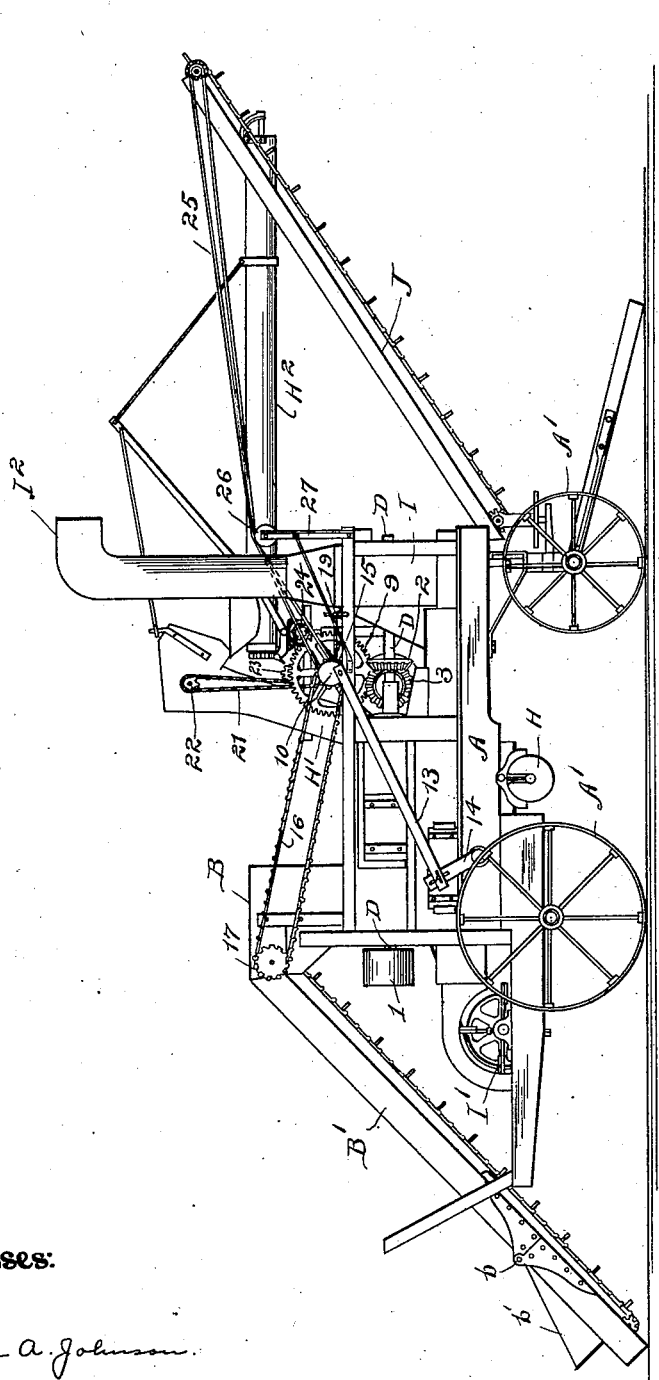
Figure 3:
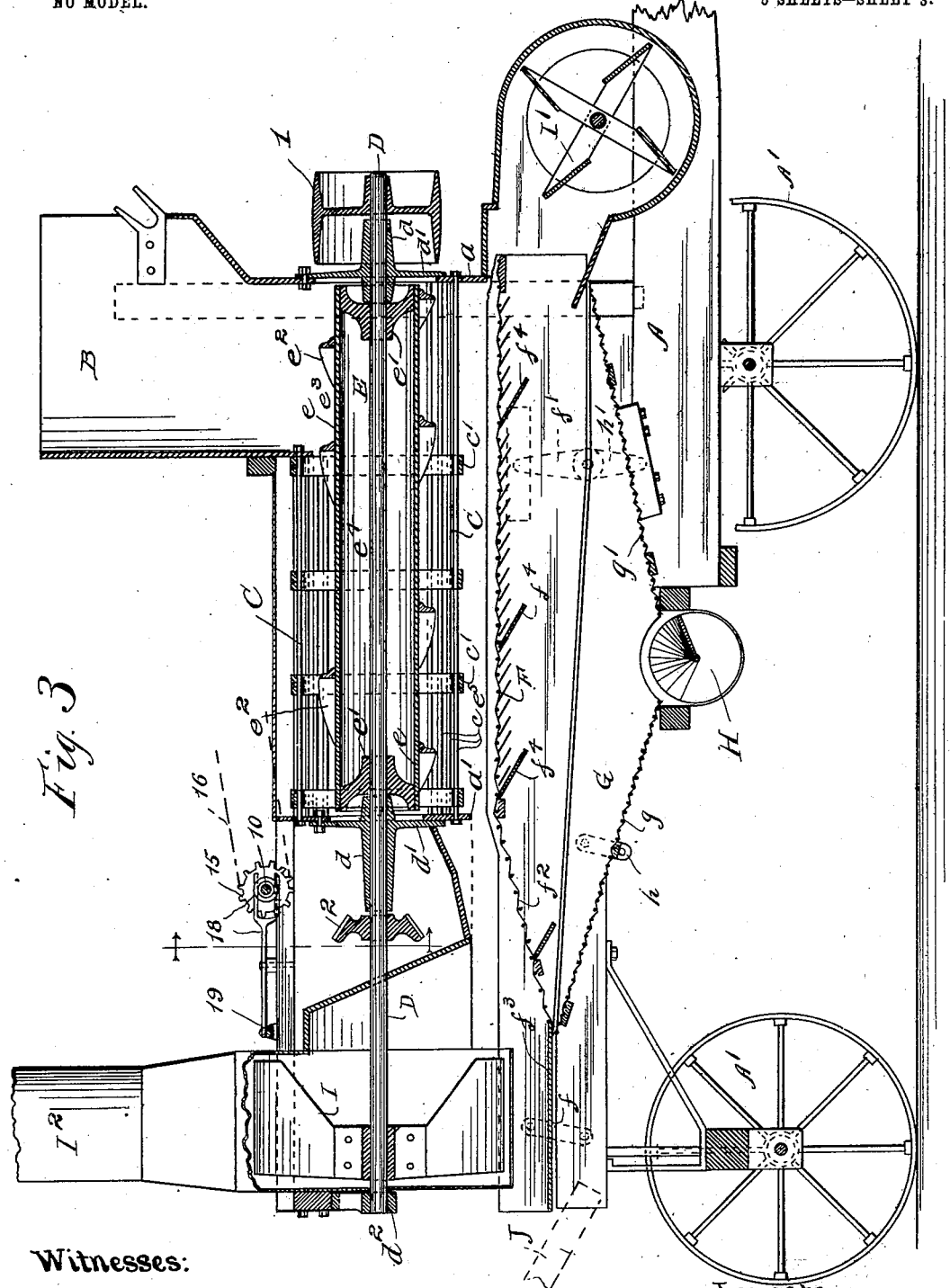
Figure 4:
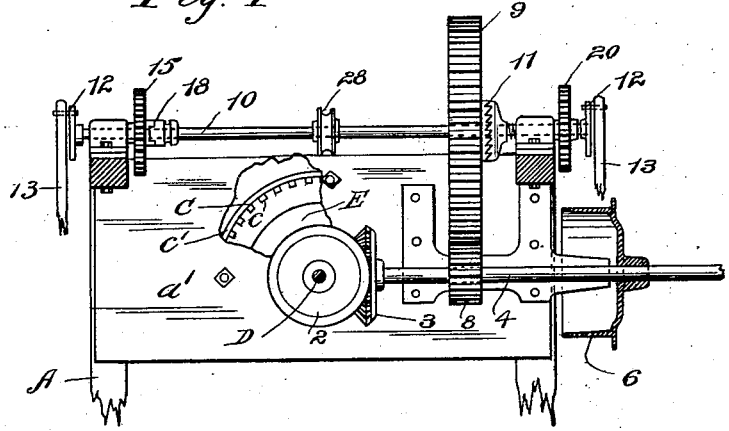
Figure 5:
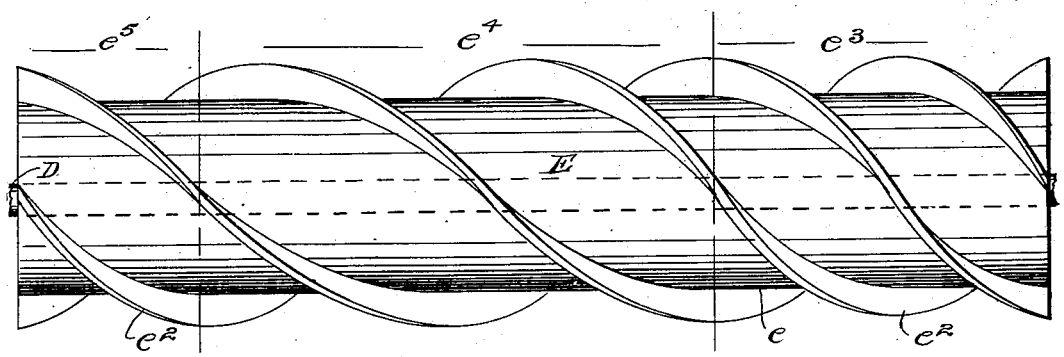
Figure 6:
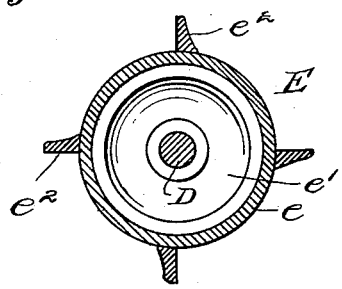

Figure 1 is a side elevation of a corn-sheller embodying our invention. Fig. 2 is an elevation of the reverse side. Fig. 3 is a longitudinal sectional view with parts removed. Fig. 4 is a sectional view taken on the line 4 4 of Fig. 3. Fig. 5 is a detail of the shelling-cylinder. Fig. 6 is a cross-section of the same. Fig. 7 is a detail of the grate-bar casing for the cylinder. Fig. 8 is an end view of the same.

The operative parts of this machine consist in an elevator for the corn on the ear, the shelling device proper, screens and blowing apparatus for cleaning the corn, dust-discharge pipe, a cob-elevator, and an elevator and distributing-leg for the shelled corn. Suitable means are provided for driving these devices.

Referring to the drawings, A represents in general a substantial and rigid frame for the machine, which is built up on main sills and rests upon a suitable running-gear on traction-wheels A'.

B is the feed-hopper, into which the ear-corn is discharged from an elevator B'. This elevator is of any well-known form and is hinged at $b$ to enable the lower part $b'$ to be raised when the sheller is moved. The corn passes from the hopper directly into one end of a cylindrical grate-bar casing C, which is preferably made up of square bars $c$, held in position by bands $c'$, the whole being supported by stiff plates $a\ a'$, forming a part of the main frame. As shown in Fig. 6, at the feed end the top bars are cut away for a distance corresponding to the size of the hopper to allow the corn to enter. A shaft D, running through the center of the casing, is suitably mounted in long bearings $d\ d$, which are flanged at $d'\ d'$ and bolted to the plates $a\ a'$, and has an end bearing $d^2$ on a cross-piece of the frame. This shaft carries our novel shelling-cylinder E, which is inclosed in the casing C and coöperates therewith to shell the corn. The cylinder as a whole comprises a central cylindrical part $e$ with bearings $e'$ on the shaft and a plurality of spiral wings or ribs $e^2$. These wings or ribs are arranged with a comparatively sharp pitch at the feed end $e^3$ to carry the corn into the casing, then for a space $e^4$ are arranged at a lesser pitch, and in this portion the principal part of the shelling is done, then at the discharge end $e^5$ are again sharp-pitched to insure a steady discharge of the cobs.

Immediately beneath the grate-bar casing C is a shaker-sieve F, hung on links or rocker-arms $f\ f'$ and extending forward with a sloping portion $f^2$, upon which the cobs fall, and a still further solid section $f^3$, which discharges the cobs into the elevator J. Beneath this sieve is a second shaker-sieve G, the two sloping portions of which, $g\ g'$, converge to discharge the corn into a worm conveyer H at the bottom of the machine. This sieve is also hung on rocker-arms $h\ h'$, pivoted at one end to the main frame. The corn is discharged from the conveyer H into an elevator H' and from thence into a distributing-leg H², which is also provided with a worm and is adapted to be swung around to load several wagons near the machine. The chaff and fine particles are carried away through a pipe I² by a blast through the screens and main part of the machine, created by a suction-fan I, clamped on the end of the main shaft D, and blower-fan I' at the forward end of the machine. Baffle-plates $f^4$ on the sieve F deflect the blast into the casing C and prevents the cylinder from becoming clogged.

The power-transmitting mechanism to operate these various devices is as follows: 1 is the main driving-pulley on the shaft D, which may be connected with any convenient source of power. A bevel-gear 2 on the same shaft meshes with a bevel-gear 3 to drive a counter-shaft 4, mounted in bearings on the main frame. It will be obvious that this counter-shaft may also be driven as the main shaft to operate the machine. A belt 5 from a pulley 6 on said counter-shaft drives the blower-fan I' by means of a pulley 7 on the shaft thereof. A pinion 8 on the counter-shaft 4 meshes with a gear 9 on a second counter-shaft 10, running across the machine at the top. The gear 9 drives the shaft 10 through the medium of a slip-clutch 11 of any well-known form of construction. This clutch is interposed in order that the motion of the shelling-cylinder may be reversed without affecting the remainder of the machine. At either end of the shaft 10 is a crank 12, connected by pitman 13 to rocker-arm 14, which vibrates the sieves F and G in such a manner that they move in opposite directions, thus preventing undue vibration of the machine. A sprocket 15 on the shaft 10 drives a chain 16, which passes around a sprocket 17 on the driving-shaft of the elevator B' and operates the elevator. The sprocket 15 may be readily thrown into and out of gear by a clutch 18, operated by a rod 19, passing across the top of the machine and provided with handles at either end, thus forming a very convenient means of immediately stopping the feed in case it becomes necessary to do so. Another sprocket 20 on the shaft 10 drives a chain 21, which passes up and over a sprocket 22, which operates the shelled-corn elevator, then down around an idler 23 and over a sprocket 24, which operates the worm in the distributing-leg through a chain of gears, and back to the sprocket 20.

The elevator J for the cobs is supported and driven by a rope 25, which passes over a pair of idlers 26 on a standard 27 at the back of the machine and around a pulley 28 on the shaft 10.

An important feature in the construction will be noted in connection with the cylinder and main driving-shaft. The hole through the plate $a$, where the flanged bearing $d$ is bolted on, is made sufficiently large to allow the cylinder E to pass through, so that in case of accident, or in any event it becomes desirable to remove the cylinder, all that is necessary is to loosen the gear 2 and fan I, take out the bolts in the flanged bearing, and then draw out the main shaft with the cylinder.

The operation of the machine is as follows: The ear-corn is shoveled upon the elevator B', which delivers it into the hopper B, and from there it passes directly into the shelling apparatus. The rapid revolution of the shelling-cylinder carries the corn forward and at the same time the centrifugal force and rotary movement keep the ears in engagement with the grate-bar cage and the wings or ribs until by the time the discharge end is reached the corn will be entirely shelled and the cobs left clean. The corn passes through the grate-bars onto the sieves F and G and into the conveyer H, which delivers it to the elevator H' and leg H², as before described. The cobs pass out upon the sieve F and directly to the elevator J. The operation of the cleaning-blast has been sufficiently described.

In practice it has been found that this sheller is better adapted for large capacity and will operate more efficiently in corn in all conditions than the ordinary shellers now in use. It does not crack the corn and will shell the corn clean from the cobs, even if wet or frozen, and also thoroughly cleans the corn and cobs of all chaff and dust.

We are aware that various changes in the details of construction and operation will readily suggest themselves as coming within the scope of our invention, and we do not wish to limit ourselves to the exact construction shown; but

What we claim, and desire to secure by Letters Patent, is—

1. In a corn-sheller, the combination of a suitable frame, cross-plates in said frame, a cylinder-shaft supported in said frame, a flanged bearing for said shaft secured to the front end plate, an aperture in said end plate large enough to admit the passage of said cylinder and covered by the flange on said bearing.

2. In a corn-sheller, in combination, a hopper, a casing, a shelling-cylinder mounted on a main driving-shaft, a gear on said shaft meshing with a gear on a counter-shaft, a pinion on said counter-shaft, engaging with a gear driving a second counter-shaft by means of a slip-clutch, whereby other parts of the machine operated by said second counter-shaft will not be driven if the motion of the main shaft is reversed.

3. In combination in a corn-sheller, a main driving-shaft carrying the shelling-cylinder, a counter-shaft driven by said main shaft, a blower, a belt from said counter-shaft to drive said blower, a second counter-shaft driven from the first by gears and a slip-clutch, a corn-elevator a chain and sprockets to drive said elevator from said second counter-shaft and a clutch on one of said sprockets.

4. In a corn-sheller, the combination of a frame, a main driving-shaft mounted in said frame, a shelling-cylinder on said shaft, a counter-shaft driven from said main shaft, a second counter-shaft driven from said first counter-shaft, an ear-corn elevator, sprockets and chain for driving said elevator from said second counter-shaft, a cob-elevator, a rope-drive from said counter-shaft to support and drive said elevator, shaker-sieves, means comprising pitman-rods from cranks on said second counter-shaft to said sieves whereby they are vibrated, a shelled-corn conveyer and distributing-leg and means from said second counter-shaft for driving the same substantially as described.

ANDREW HERMAN BERNS.
HERMAN ANDREW BERNS.

Witnesses:
J. P. H. TRESCOTT,
HARVEY ALLEN.